US007797323B1

United States Patent
Eshghi et al.

(10) Patent No.: US 7,797,323 B1
(45) Date of Patent: Sep. 14, 2010

(54) PRODUCING REPRESENTATIVE HASHES FOR SEGMENTS OF A FILE

(75) Inventors: Kave Eshghi, Los Altos, CA (US); George H. Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 661 days.

(21) Appl. No.: 11/546,235

(22) Filed: Oct. 11, 2006

(51) Int. Cl.
*G06F 7/00* (2006.01)
(52) U.S. Cl. .................................. 707/737; 707/747
(58) Field of Classification Search ............. 707/747, 707/737, 6, 999.006, 999.101, 101
See application file for complete search history.

(56) References Cited

U.S. PATENT DOCUMENTS

2005/0091234 A1* 4/2005 Hsu et al. ................ 707/100
2005/0097313 A1* 5/2005 Bolosky et al. ........... 713/150

OTHER PUBLICATIONS

Niraj Tolia, Opportunistic Use of Content AddressableStorage for Distributed File Systems, 2003, The USENIX Association, p. 127-140.*

George Forman, Finding Similar Files in Large Document Repositories, Aug. 21-24, 2005, ACM, p. 394-400.*

G.H. Forman et al., U.S. Appl. No. 11/156,955, entitled "Identification of Files with Similar Content," filed Jun. 20, 2005, pp. 1-19, Figs. 1-5.

K. Eshghi et al., U.S. Appl. No. 11/345,834, entitled "Segmentation of Data Sequence," filed Feb. 1, 2006, pp. 1-24, Figs. 1A-9.

A.Z. Broder et al., "Min-Wise Independent Permutations," pp. 1-36 (1998).

K. Eshghi et al., "A Framework for Analyzing and Improving Content-Based Chunking Algorithms," pp. 1-10 (2005).

http://en.wikipedia.org/wiki/Hash_function, definition for hash function, pp. 1-4 (at least as early as Jul. 27, 2006).

* cited by examiner

*Primary Examiner*—Hosain T Alam
*Assistant Examiner*—Amy Ng

(57) ABSTRACT

A file is divided into plural segments, and for each of at least some of the plural segments, plural windows covering different portions of the corresponding segment are defined. According to a predefined criterion, one of the windows associated with the corresponding segment is selected. A representative hash based on the portion in the selected window is calculated for representing the corresponding segment.

20 Claims, 3 Drawing Sheets

PRODUCING REPRESENTATIVE HASHES FOR SEGMENTS OF A FILE

BACKGROUND

File systems (such as file servers in data warehouses or other data repositories) can store large numbers of files. Various management and/or processing tasks can be performed with respect to files contained in the file systems. For example, it may be desirable to identify duplicate files or to identify older or obsolete versions of files, which take up valuable storage space. Also, the presence of duplicate or obsolete versions of files tends to increase processing times when files are being retrieved or manipulated. As another example, if the processing task is a search task, then duplicate or obsolete versions of files can be output as search results, which tends to pollute the list of search results, and can be troubling the end user.

Generally, conventional techniques of identifying duplicate or similar files tend to be inefficient.

BRIEF DESCRIPTION OF THE DRAWINGS

Some embodiments of the invention are described with respect to the following figures.

DETAILED DESCRIPTION

Figure 1:
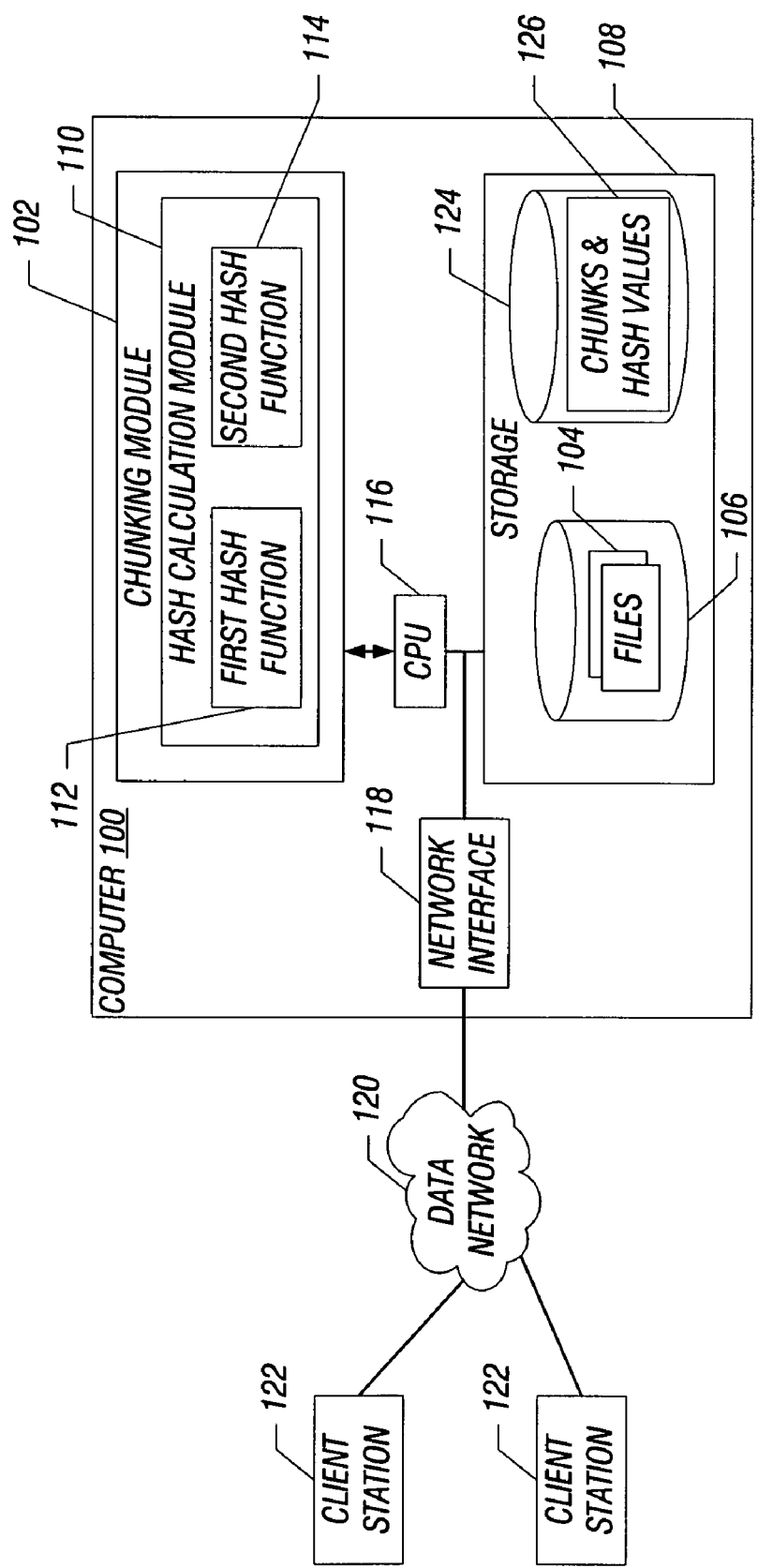
FIG. 1 is a block diagram of an arrangement including a computer that incorporates an embodiment of the invention.

In accordance with some embodiments, a file is divided into multiple chunks, where each chunk is assigned a representative hash. A "file" refers to any one or more of the following: a document (such as a document produced or edited by a software application), a collection of data, a sequence of data, or any other grouping of data. The term "chunk" refers to a segment of the file, where the chunk is produced by chunking the file based on the content of the file (which is contrasted with segmenting the file according to a size of the file, or segmenting the file into segments of a target size). Because chunks of a file are identified based on their content, the chunks of the file can have varying sizes. Chunking is described in further detail below.

More generally, techniques according to some embodiments for assigning hash values can be applied to other types of segments. Segmenting refers to any division of a file into multiple segments. The following discussion focuses on chunks; however, it is noted that some embodiments can be applied to other segments.

In accordance with some embodiments, a representative hash is assigned to each chunk of a file based on applying a hash function to a portion of the chunk, where the portion is less than the entirety of the chunk. The set of representative hashes thus created for a file is used for comparing the file with other files. Two files are deemed to be similar if they share a number of representative hashes; the more representative hashes they share, the more similar they are. A hash function is a deterministic function that takes a sequence of bytes as input and returns a sequence of bytes as output. The output of the function is referred to as the "hash" of the input. A property of certain types of hash functions is that the hashes of two byte sequences are the same if and almost always only if the two byte sequences are identical. If even one byte is different in the two sequences, then it is likely that the hashes of the two sequences will differ.

Conventional techniques typically derive the representative hash of a chunk by applying a hash function to the entirety of the chunk. As a result, the representative hash of two chunks will be different if the two chunks differ even by one byte. If the sizes of chunks are large, then for each given chunk, it is more likely that there will be a small change in the chunk, which will cause the representative hash for the given chunk to change. As a result, to achieve reasonable detection rates of similar files, conventional techniques specify the use of relatively small average chunk sizes. Use of smaller chunk sizes reduces the likelihood that the representative hash of a given chunk of a file will change in value when a relatively small change to the file is made. However, use of smaller chunks leads to an increase in the number of representative hashes; the number of representative hashes of a file is inversely proportional to the average chunk size. Large numbers of representative hashes leads to increased burden on processing and storage resources for applications attempting to use the representative hashes for a particular purpose, such as for determining similarity of files.

In accordance with some embodiments, the average chunk size is increased (to reduce the number of representative hashes associated with a file) without substantially impacting the accuracy of an algorithm that uses the representative hashes (such as an algorithm for performing similarity comparison of files). To achieve accuracy while maintaining increased average chunk size, each representative hash calculated is based on a portion (less than the entirety) of the chunk, rather than applying a hash function to the entire chunk. Such a representative hash is referred to as a "soft hash," which has the following property: if two chunks differ slightly from each other, then their soft hashes are the same with high probability; and if two chunks are substantially different, then their soft hashes will be different with high probability. By using soft hashes as representative hashes, average chunk sizes can be increased since chunks that are "close enough" will have the same representative hash with high probability.

The representative hashes produced according to some embodiments for chunks of a file can be used for various applications. As mentioned above, one such application is for comparison of files to determine similarity (or duplication) of files. Other applications include one or more of the following: (1) similarity clustering, such as K-center clustering, including K-means clustering (to divide a collection of files into plural partitions or clusters); (2) similarity-based retrieval (where the closest file to a given file is retrieved, such as from a database); and (3) content-based routing (where similar files are co-located in a storage location).

Other example applications that are able to use the representative hashes generated according to some embodiments include developing pointers for files (where a pointer is made up of a set of representative hashes). Thus, for example, if a file has N chunks, then N representative hashes will be generated for the file. These N representative hashes can be part of a set of representative hashes representing the pointer of the file. The pointers developed for multiple files can be used for indexing the files. A benefit of using pointers based on representative hashes developed for chunks of a file is that when a query is made using such a pointer, the result for the query can include not just the file associated with the pointer, but all other files that are close to the file (having some soft representative hashes in common). In this manner, files that are the same as the requested file but which may have been edited slightly can be identified in response to the query.

FIG. 1 illustrates a computer that has a chunking module according to some embodiments. The chunking module is used to perform chunking of files contained in a database 106, which is stored in a storage system 108 of the computer 100. In an alternative implementation, the storage 108 can be located outside the computer 100. Also, instead of being located in a single database 106, the files 104 can be stored in multiple databases. The chunking module 102 divides each file 104 into multiple chunks, where each chunk is based on the content of the file.

The chunking module 102 includes a representative hash calculation module 110 for calculating representative hashes for chunks. Although depicted as being part of the chunking module 102, it is noted that the representative hash calculation module 110 can be a module separate from the chunking module 102. The representative hash calculation module 110 includes a first hash function 112 and a second hash function 114 that are used for calculating representative hashes based on portions of chunks. In some embodiments, the first and second hash functions 112 and 114 are different hash functions, with the first hash function being a more processing efficient function for calculating hashes quickly, and the second hash function being a collision-resistant function that is possibly more processing-intensive. Collision occurs when the hashes of two different input values turn out to be the same.

As used here, the term "module" or "function" refers to a software and/or hardware module or function. A module or function can refer to a single module or function or multiple modules or functions.

An example of the first hash function 112 is a Rabin fingerprint algorithm, which is relatively high speed. Examples of the second hash function 114 include MD5, SHA-1 (secure hash algorithm), and others. If implemented with software, the chunking module 102, hash calculation module 110, and hash functions 112, 114 are executable on a central processing unit (CPU) 116, or plural CPU(s).

The computer 100 also includes a network interface 118 to allow the computer 100 to communicate over a data network 120 with remote client stations 122. Users at the client stations 122 can submit requests to the computer 100 for the purpose of invoking the chunking module 102 to divide files into chunks and to assign representative hashes to the chunks, in accordance with some embodiments. The chunks and representative hashes can be stored in a database 124 in one or more tables 126.

Figure 2:
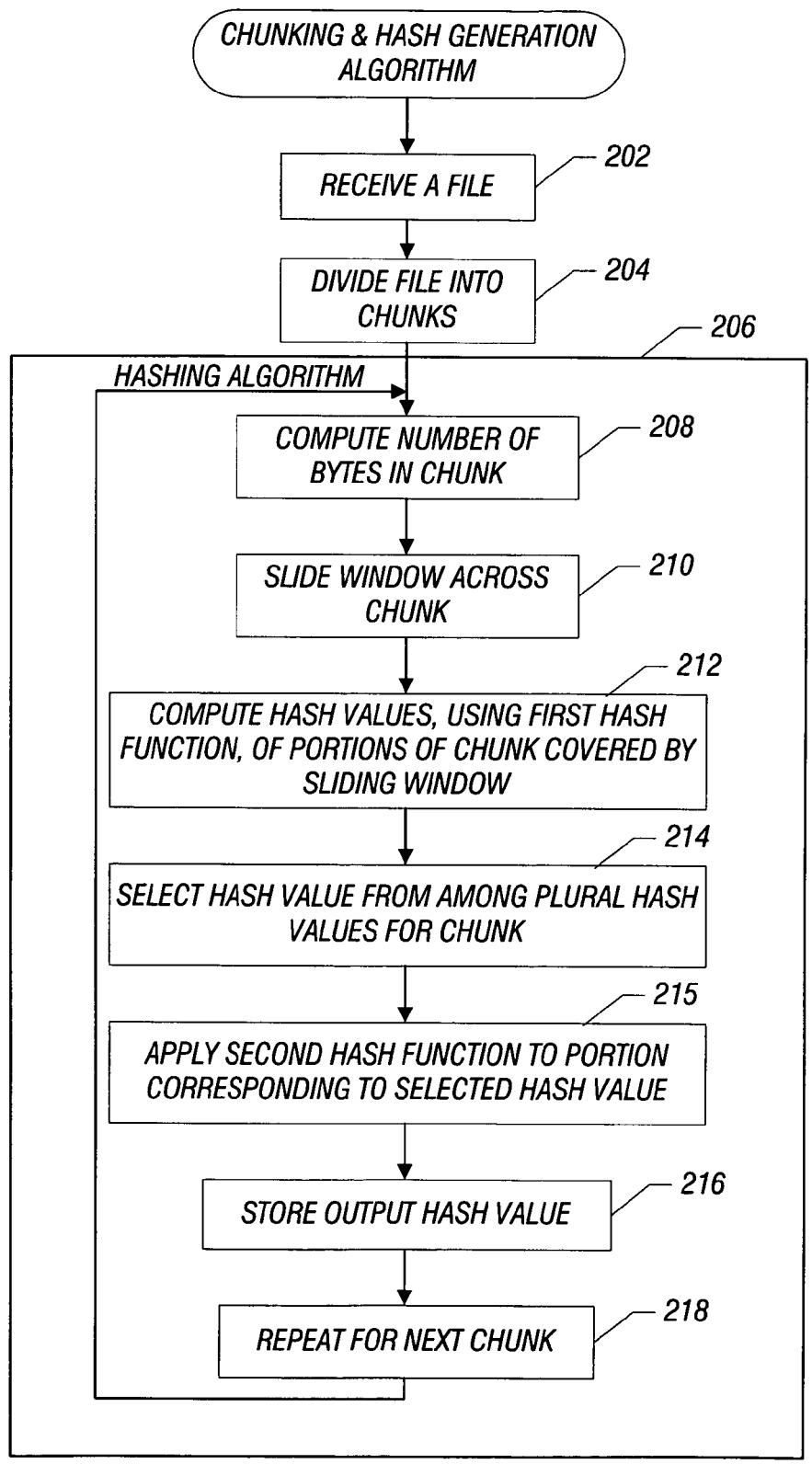
FIG. 2 is a flow diagram of a process of performing a chunking and hash generation algorithm, according to an embodiment.

A chunking and representative hash generation algorithm, as performed by the chunking module 102, is depicted in FIG. 2. The chunking module 102 receives (at 202) a file. The chunking module 102 then divides (at 204) the file into multiple chunks. An exemplary algorithm for chunking is as follows.

Assume a pair of integers D and r, wherein r<D (r and D being predefined integers). A fixed width sliding window of width W (a predetermined value) is moved across the file. At every position k in the file, a fingerprint $F_k$, of the content of this window is computed. The fingerprint, for example, is computed using a fingerprint algorithm (such as Rabin's fingerprint algorithm). Accordingly, the position k is a chunk boundary if $F_k$ mod D=r; otherwise, the position k is not a chunk boundary. The above is an example of a sliding window algorithm for chunking. Generally, a chunking technique selects chunk boundaries (and therefore defines chunks) based on applying a function (e.g., the fingerprint algorithm above) on corresponding portions of content of the file. Additional details regarding the chunking technique can be found in Kaye Eshghi et al., "A Framework for Analyzing and Improving Content-Based Chunking Algorithms" HPL-2005-30 (R.1) (2005). In other embodiments, other chunking techniques can be used.

In content-based chunking, if additional data is inserted into a file or data is removed from the file, the chunk breakpoints or boundaries are less likely to change than with fixed size segments. In other words, chunk boundaries in locations outside of the modification mostly remain in the same position relative to each other. As such, the boundaries of content-based chunking are more stable during local modification to the content of the file.

Next, as further depicted in FIG. 2, a representative hash determination algorithm is performed (at 206) by the representative hash calculation module 110. The representative hash determination algorithm is performed iteratively one chunk at a time to generate a representative hash for each chunk. For the current chunk b, the representative hash calculation module 110 computes (at 208) a number of bytes len(b) in the chunk b. Alternatively, rather than computing the number of bytes, the representative hash calculation module 110 can compute a different indicator of the size of a chunk, such as the number of bits and so forth.

Next, the representative hash calculation module 110 slides (at 210) a window across the chunk. The size of the window is referred to as window size w, where the window size w is typically less than the size of the chunk b. As the window is slid across the chunk, multiple windows are defined and multiple hashes are computed (at 212), using the first hash function 112, of corresponding portions of the chunk covered by the corresponding window. Thus, for each given chunk, multiple hashes for different windows are generated by the first hash function 112. As noted above, the first hash function 112 is a relatively high speed hash function that can quickly calculate hashes for different portions of a chunk.

The representative hash calculation module 110 then selects one of the multiple windows by selecting (at 214) a hash from among the plural hashes for the chunk. In one embodiment, the selected hash is the maximum hash from among the multiple hashes. However, in other embodiments, other criteria can be used for selecting the hash, such as selecting the minimum hash or selecting a hash based on some mathematical computation. Instead of selecting a maximum or minimum hash, some larger or smaller hash can be chosen instead (e.g., the second largest or smallest hash). Another criterion can be to reverse the bits of each hash, and then select the maximum (or minimum) value. A further criterion can be to compute a new hash function on each hash, and selecting the maximum or minimum. Yet another criterion can be to use a table mapping a hash values (or portions of hash values) to integers, and choosing the hash value that maps to the highest (or lowest) integer.

The representative hash calculation module 110 next applies (at 215) the second hash function on content in the selected window of the chunk to produce an output representative hash to represent the chunk. Note that the second hash function can be more collision-resistant than the first hash function.

The output representative hash is then stored (at 216) by the representative hash calculation module 110, such as in the database 124. If there are more chunks to the process, then the procedure at 208-216 is repeated (at 218) for the next chunk.

The above hashing algorithm is expressed more specifically as follows. For a given chunk b, compute len(b) as the number of bytes in b. Integers w (sliding window size) and i are defined, where $0<w\leq len(b)$ and $0\leq i<len(b)-w$. Then b[i,w] includes a portion of the chunk from the sequence of chunks $b_i, b_{i+1}, \ldots, b_{i+w-1}$ in the file 104. The parameter b[i, w] is the ith w-gram of b, where w-gram represents the portion of the chunk covered by the sliding window.

The algorithm of FIG. 2 is performed specifically as follows, in accordance with an example implementation. If len (b)≦w (in other words, the length of the chunk is less than the sliding window size), then h(w) is returned as the representative hash for the byte array b. The value h(w) represents application of the second hash function 114 to the chunk. In other words, if the size of the chunk b is less than the window size, then sliding of a window across the chunk is not performed. In this scenario, the second hash function is simply applied on the entire chunk, padded with zeroes in some implementations.

Otherwise, if len(b)>w, the first hash function 112 is applied to each w-gram. In other words, for all 0≦i<len(b)−w, calculate $z_i = f(b[i,w])$, where $f()$ represents the first hash function 112. Let $z^{max}$ be the largest of the $z_i$. Let j be the smallest integer such that $z_j = z^{max}$. The representative hash calculating module 110 returns h(b[j,w]) as the representative hash of the chunk b.

Another way of describing the algorithm above is as follows: for all the w-grams in chunk b, calculate the fingerprint of each w-gram using $f$ (the first hash function 112). Choose the w-gram with the largest fingerprint. If there is more than one such w-gram, choose the first one in the sequence. Return the hash of this w-gram using the function h (second hash function 114) as the representative hash.

The following explains why representative hashes that are based on just a portion (rather than the entirety) of a chunk can be used as the chunks representative. Let P and Q be two chunks. Let $W_P$ and $W_Q$ be the set of w-grams in P and Q. Let $F_P$ and $F_Q$ be the set of fingerprints, using $f$, of the w-grams in P and Q. Let $m_P$ and $m_Q$ be the maximal elements of $F_P$ and $F_Q$. Then, provided that f is a 'min-wise independent' hash function, and there are no hash collisions for f in $W_P \cup W_Q$ (which can be succinctly stated as $|W_P \cup W_Q| = |F_P \cup F_Q|$)

$$P(m_P = m_Q) = \frac{|F_P \cap F_Q|}{|F_P \cup F_Q|}.$$

In other words, the probability that the two maximum hashes are equal is proportional to the degree of overlap between the two sets of w-grams divided by the total number of w-grams in the two sets. So, if two chunks are substantially similar (most of their w-grams are the same), their maximum hash is going to be the same with large probability. Two hash functions, $f$ and h, are used to calculate the representative hash. To satisfy the formula above, $f$ (the first hash function 112) should be collision resistant over the set $W_P \cup W_Q$. The size of this set is less than the sum of the length of the two chunks. So, if the average chunk size is 1 kilobyte, for example, $f$ should be collision resistant over a set of w-grams in the order of 2 k. On the other hand, h (the second hash function 114) should be collision resistant over the set of all chunk hashes in all the files. The degree of collision resistance of a hash function is directly related to its output range. So $f$ and h should be selected to have sufficient output range to achieve acceptable collision resistance. Sufficient output range is dependent upon the expected chunk sizes and expected number of chunks in the files.

Once the representative hashes produced by the chunking and hash generation algorithm are generated and stored, such as in the database 124, the representative hashes are available for use by various applications, including the applications discussed above. For example, chunks and their associated representative hashes of files that are to be compared are retrieved and used to determine similarity of the files. For example, a similarly score can be generated, where a score greater (or less) than a threshold is an indication that files are either duplicates or closely similar.

In an alternative embodiment, a file can be divided into chunks having a hierarchical arrangement (e.g., a hash-based directed acyclic graph). A linear sequence, representing the file, is transferred into a tree structure (or other hierarchical arrangement) of chunks. Representative hashes can be generated for each of the chunks based on a portion (less than the entirety) of the chunk in the same manner as discussed above. Further details regarding transforming a file into a hierarchical arrangement are provided in U.S. Ser. No. 11/345,834, entitled "Segmentation of a Data Sequence," filed February 2006.

The algorithm described above produces one representative hash for every chunk. As a result, since the average chunk size is constant, the number of representative hashes generated is in proportion to the size of the file. In other words, the larger the file, the larger the number of representative hashes. However, in some cases, it is desired that the number of representative hashes be within a certain range regardless of the size of the file.

In accordance with some embodiments, a thinning technique is applied to reduce the number of representative hashes such that representative hashes fall within a certain range. The average chunk size is maintained the same for all file sizes, but the number of representative hashes is thinned based on the size of the file. This range is defined as a range between D and 2D, where D is some predefined integer. The number of representative hashes output will be in the range between D and 2D.

Figure 3:
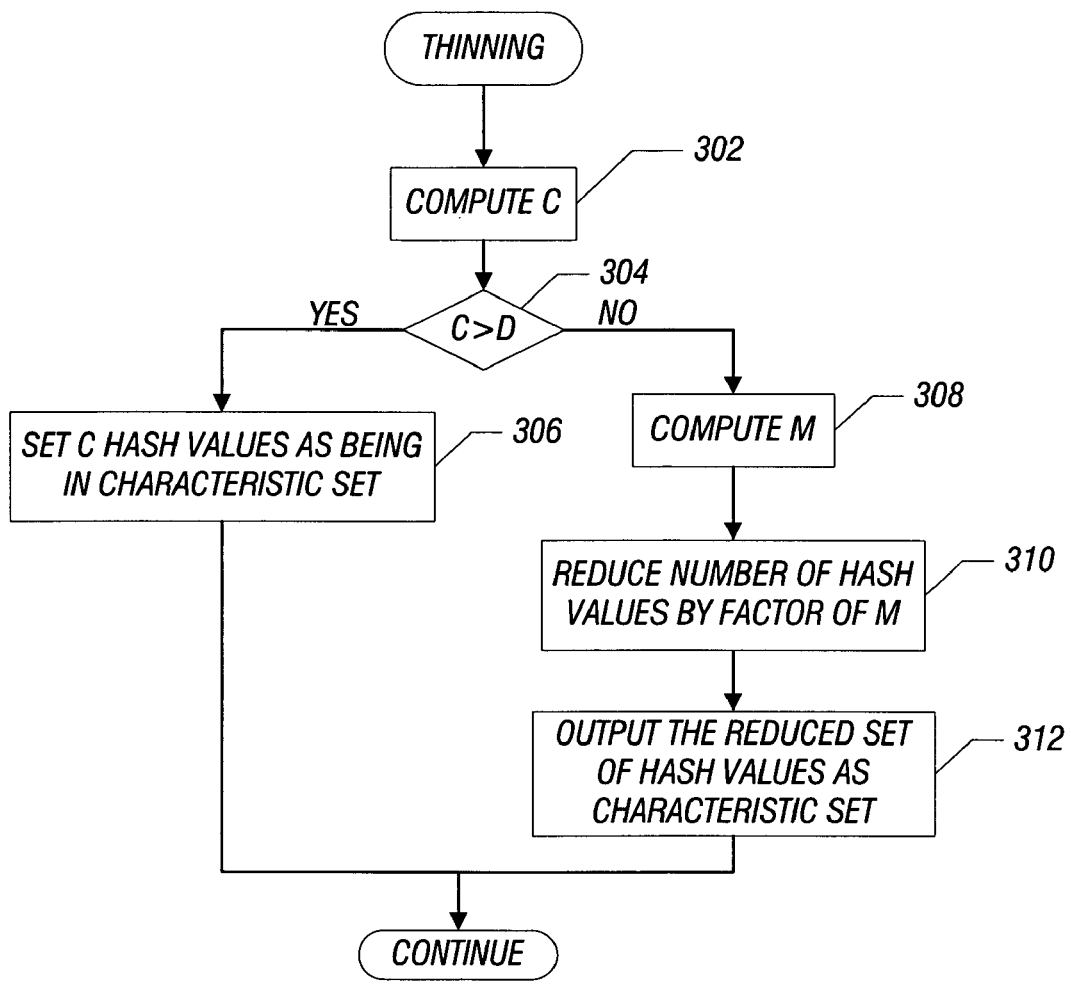
FIG. 3 is a flow diagram of a process for a thinning algorithm, according to an embodiment.

As depicted in FIG. 3, the thinning technique, as performed by the chunking module 102, starts by computing (at 302) the number of chunks (and thus representative hashes) for a particular file that is being processed. This number is represented as C.

Next, the chunking module 102 determines (at 304) whether C is less than D (which means that the particular file has fewer chunks (and thus representative hashes) than the low end (D) of the expected range of the number of representative hashes. In this case, the C representative hashes already computed are provided (at 306) as being in the characteristic set. The characteristic set refers to the set of representative hashes associated with the particular file that can be used by various applications.

However, if C≧D, then thinning is performed. A value M is computed (at 308) that is used to reduce (at 310) the number of representative hashes. In some embodiments, the reduction of the number of representative hashes is by a factor of M; in other words, the number of representative hashes of the particular file is divided by M. In one implementation, let $M = \lfloor \log_2(C) - \log_2(D) \rfloor$. In other words, M is the integer part of $\log_2(C) - \log_2(D)$. Then the representative hashes whose M lowest bits are zero (or any other predefined number) are selected as the representative hashes to use. The reduced number of representative hashes are output (at 312) as the characteristic set.

Some benefits offered by a thinning algorithm according to some embodiments include the following. The expected number of representative hashes in the characteristic set does not exceed 2D, and if C>D, the expected number of representative hashes is in the desired range between D and 2D. The characteristic set is also stable under modification. In other words, if a relatively small modification of the original file is made, the characteristic set changes only moderately. Most importantly, some of the representative hashes of the characteristic set survive even when the original file is included in a bigger file. For example, let the size of the original file be l, and consider the case where another file of size l is appended to the original file. Roughly half the representative hashes in the characteristic set of the original file will survive in the characteristic set of the new, larger file.

Instructions of software described above (including the chunking module 102 and hash calculation module 110 of FIG. 1) are loaded for execution on a processor (such as one or more CPUs 116 in FIG. 1). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executable in a computer, comprising:
    dividing, by the computer, a file into plural segments;
    for each of at least some of the plural segments, the computer
        defining plural windows covering different portions of the corresponding segment;
        according to a predefined criterion, selecting one of the windows associated with the corresponding segment;
        producing a representative hash based on the portion in the selected window for representing the corresponding segment;
        calculating hashes for the plural windows using a first hash function, wherein selecting the window is based further on the hashes for the plural windows; and
        using a second, different hash function to calculate the representative hash, wherein the representative hash is calculated by applying the second hash function to content of the selected window, wherein the first hash function applied to content of the corresponding windows of each segment is a higher speed hash function than the second hash function, such that the first hash function is computed more quickly for the content of the selected window than the second hash function.

2. The method of claim 1,
    wherein selecting one of the windows is according to the predefined criterion specifying that the window associated with a larger one of the hashes is selected.

3. The method of claim 1, further comprising;
    repeating the defining, selecting, producing, calculating, and using steps for each of other segments of the file such that respective representative hashes are provided for the plural segments of the file.

4. The method of claim 1, further comprising using the representative hashes of the file to enable comparison of the file with at least another file to determine similarity of the files.

5. The method of claim 1, further comprising producing representative hashes of segments of other files according to the dividing, defining, selecting, producing, calculating, and using steps.

6. The method of claim 5, further comprising using the representative hashes of the segments of the files to perform at least one of similarity clustering of the files, similarity-based retrieval of the files, content-based routing of the files, and generation of pointers for the files.

7. The method of claim 1, wherein dividing the file into plural segments comprises dividing the file into plural chunks using a chunking technique.

8. The method of claim 7, wherein dividing the file into plural chunks using the chunking technique comprises using the chunking technique that identifies boundaries of the chunks using a fingerprint algorithm.

9. The method of claim 1, further comprising:
    applying a thinning algorithm to reduce a number of representative hashes associated with the file.

10. The method of claim 9, wherein applying the thinning algorithm comprises computing a value M that represents a factor by which the number of representative hashes associated with the file is to be reduced.

11. The method of claim 10, wherein computing the value M is based on a number of segments in the file and a predefined lower end of a range of a target number of representative hashes.

12. The method of claim 1, wherein the segments are in a hierarchical arrangement, and wherein calculating the representative hashes comprises calculating the representative hashes for the segments in the hierarchical arrangement.

13. The method of claim 1, wherein the second hash function is more collision-resistant than the first hash function.

14. The method of claim 1, wherein the first hash function is a Rabin fingerprint algorithm, and the second hash function is selected from among an MD5 and an SHA-1 algorithm.

15. A method comprising:
    dividing, by a computer, a file into plural chunks;
    producing, by the computer, representative hashes representing corresponding chunks, wherein each representative hash of each of at least some of the chunks is based on a portion less than an entirety of the corresponding chunk; and
    using the representative hashes to perform a task,
    wherein producing the representative hashes comprises:
    for each of the at least some chunks,
        sliding a window across the chunk;
        calculating hashes using a first hash function for plural corresponding portions of the chunk as the window is slid across the chunk;
        selecting one of the plural portions based upon the calculated hashes; and
        applying a second, different hash function to the selected portion to produce an output representative hash to represent the chunk, wherein the first hash function applied to the portions of the chunk is a higher speed hash function than the second hash function such that the first hash function is computed more quickly for the selected portion than the second hash function.

16. The method of claim 15, wherein dividing the file into plural chunks uses a chunking technique that selects chunk boundaries based on applying a function on corresponding portions of content of the file.

17. The method of claim 15, wherein the second hash function is more collision-resistant than the first hash function.

18. The method of claim 15, wherein the first hash function is a Rabin fingerprint algorithm, and the second hash function is selected from among an MD5 and an SHA-1 algorithm.

19. A computer-readable storage medium storing instructions that when executed cause a computer to:
  divide a file into plural segments;
  for each of at least some of the plural segments,
    define plural windows covering different portions of the corresponding segment;
    calculate, using a first hash function, hashes for the plural windows of the corresponding segment; and
    according to a predefined criterion, select one of the windows for which an output representative hash is calculated for representing the corresponding segment; and
  apply a second, different hash function to content of the selected window to calculate the representative hash, wherein the first hash function applied to content of corresponding windows of each segment is a higher speed hash function than the second hash function such that the first hash function is computed more quickly for the selected window than the second hash function.

20. The -computer-readable storage medium of claim 19, wherein the instructions when executed cause the computer to further:
  produce representative hashes of segments of other files according to the dividing, defining, calculating, selecting, and applying steps; and
  use the representative hashes of the segments of the files to perform at least one of comparing the files, similarity clustering of the files, similarity-based retrieval of the files, content-based routing of the files, and generation of pointers for the files.

* * * * *

UNITED STATES PATENT AND TRADEMARK OFFICE
CERTIFICATE OF CORRECTION

| | | |
|---|---|---|
| PATENT NO. | : 7,797,323 B1 | Page 1 of 1 |
| APPLICATION NO. | : 11/546235 | |
| DATED | : September 14, 2010 | |
| INVENTOR(S) | : Kave Eshghi et al. | |

It is certified that error appears in the above-identified patent and that said Letters Patent is hereby corrected as shown below:

In column 3, line 3, after "computer" insert -- 100 --.

In column 3, line 3, after "module" insert -- 102 --.

In column 3, line 4, after "module" insert -- 102 --.

In column 3, line 5, after "files" insert -- 104 --.

In column 8, line 1, in Claim 3, delete "comprising;" and insert -- comprising: --, therefor.

In column 10, line 12, in Claim 20, delete "-computer" and insert -- computer --, therefor.

Signed and Sealed this
Twenty-sixth Day of April, 2011

David J. Kappos
*Director of the United States Patent and Trademark Office*